US009167639B2

United States Patent
Chen et al.

(10) Patent No.: US 9,167,639 B2
(45) Date of Patent: *Oct. 20, 2015

(54) UNIVERSAL LED BALLAST COMPATIBLE CONTROLLER DEVICE

(71) Applicant: Great Eagle Lighting Corporation, Porter Ranch, CA (US)

(72) Inventors: Andy T. Chen, Porter Ranch, CA (US); Johny Lau, Oakland Gardens, NY (US)

(73) Assignee: Great Eagle Lighting Corporation, Bayside, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/087,131

(22) Filed: Nov. 22, 2013

(65) Prior Publication Data

US 2014/0125253 A1     May 8, 2014

Related U.S. Application Data

(63) Continuation-in-part of application No. 13/603,511, filed on Sep. 5, 2012, now Pat. No. 8,618,746.

(51) Int. Cl.
  *H05B 37/02* (2006.01)
  *H05B 33/08* (2006.01)

(52) U.S. Cl.
  CPC ............ *H05B 33/0809* (2013.01); *H05B 37/02* (2013.01); *H05B 33/0887* (2013.01); *Y02B 20/386* (2013.01)

(58) Field of Classification Search
  CPC .......... H05B 33/0884; H05B 33/0881; H05B 37/02; H05B 37/0281
  USPC .................. 315/246, 287, 291, 294, 307, 360
  See application file for complete search history.

(56) References Cited

U.S. PATENT DOCUMENTS

| | | | |
|---|---|---|---|
| 8,956,013 B1 * | 2/2015 | Shew | F21S 9/022 362/183 |
| 2003/0127991 A1 * | 7/2003 | Cash | G02B 21/06 315/291 |
| 2008/0290814 A1 * | 11/2008 | Leong et al. | 315/294 |
| 2012/0319582 A1 * | 12/2012 | Shan | 315/77 |

* cited by examiner

*Primary Examiner* — Tung X Le

(57) ABSTRACT

A device and method to interface with a Magnetic or Electronic Fluorescent Ballast; evaluate, process, and regulate the incoming power from the Ballast device and output a steady AC power that can be used by LED drivers, LED chips, or set of multiple LED chips in a Tube or Bulb application. This device and method will allow for a non-fluorescent replacement lighting device such as a LED Lighting Tube or Bulb to be used as a universal LED ballast compatible device in a Fluorescent Light Luminaire (fixture) without any electrical wiring modification or removal of the Electronic or Magnetic Ballast.

4 Claims, 7 Drawing Sheets

UNIVERSAL LED BALLAST COMPATIBLE CONTROLLER DEVICE

This is a continuation-in-part of prior application Ser. No. 13/603,511, filed Sep. 5, 2012, to which priority under 35 U.S.C. §120 is claimed.

BACKGROUND

The use of glass fluorescent tubes for general purpose lighting has increased dramatically over the last several decades driven by energy savings and longer bulb life. Today, the use of fluorescent lighting is a major source of illumination in home, commercial, and office applications.

While the operating life of a glass fluorescent tube is longer than an incandescent bulb, the fluorescent tube has some drawbacks. These drawbacks include their use of rare-earth elements and other potentially toxic phosphors to generate light. This presents a problem when fluorescent tubes cease to function and then require disposal. The phosphors can present a toxic waste situation. Also, because the envelope of the tube is thin glass, the potential risk for accidental breakage and exposure to sharp broken glass and the scattering of toxic material is high.

Newer technology lighting devices such as Light Emitting Diode (LED) Light Tubes and Bulbs are becoming more widely available and at lowering costs. These LED Lighting devices have a longer operating life and to not have the issues of glass fragility or toxic material disposal of a glass fluorescent gas tube.

One major area of benefit would be to allow the use of these newer long life LED Lighting Tubes or Bulbs to replace the glass fluorescent gas tubes. However, existing fluorescent lighting luminaires or fixtures incorporate a Magnetic or Electronic Ballast to turn on the gas within a glass fluorescent tube through the use of various voltage and current techniques. There are many different start-up techniques to light up the gasses in a fluorescent tube. Some of these techniques called Pre-heat, Rapid Start, and Instant Start use different combinations of current and high voltage to excite or warm up the gasses in the fluorescent tube to enable the tube to become fully lit.

INTRODUCTION

This new innovation relates to a circuit device which takes in an AC power input from a Magnetic or Electronic Fluorescent lamp ballast then evaluates, controls, and regulates the output voltage and current to provide a functional and safe power to operate a non-fluorescent replacement lighting device such as a Light Emitting Diode (LED) Lighting Tube or Bulb. This new innovation relates to a circuit device that will allow for a non-fluorescent replacement lighting devices like an LED Lighting Tube or Bulb to be used as a universal LED ballast compatible device in a Fluorescent Light Luminaire (fixture) without any electrical wiring modifications or removal of the Electronic or Magnetic ballast.

DETAILED DESCRIPTION

Figure 1:
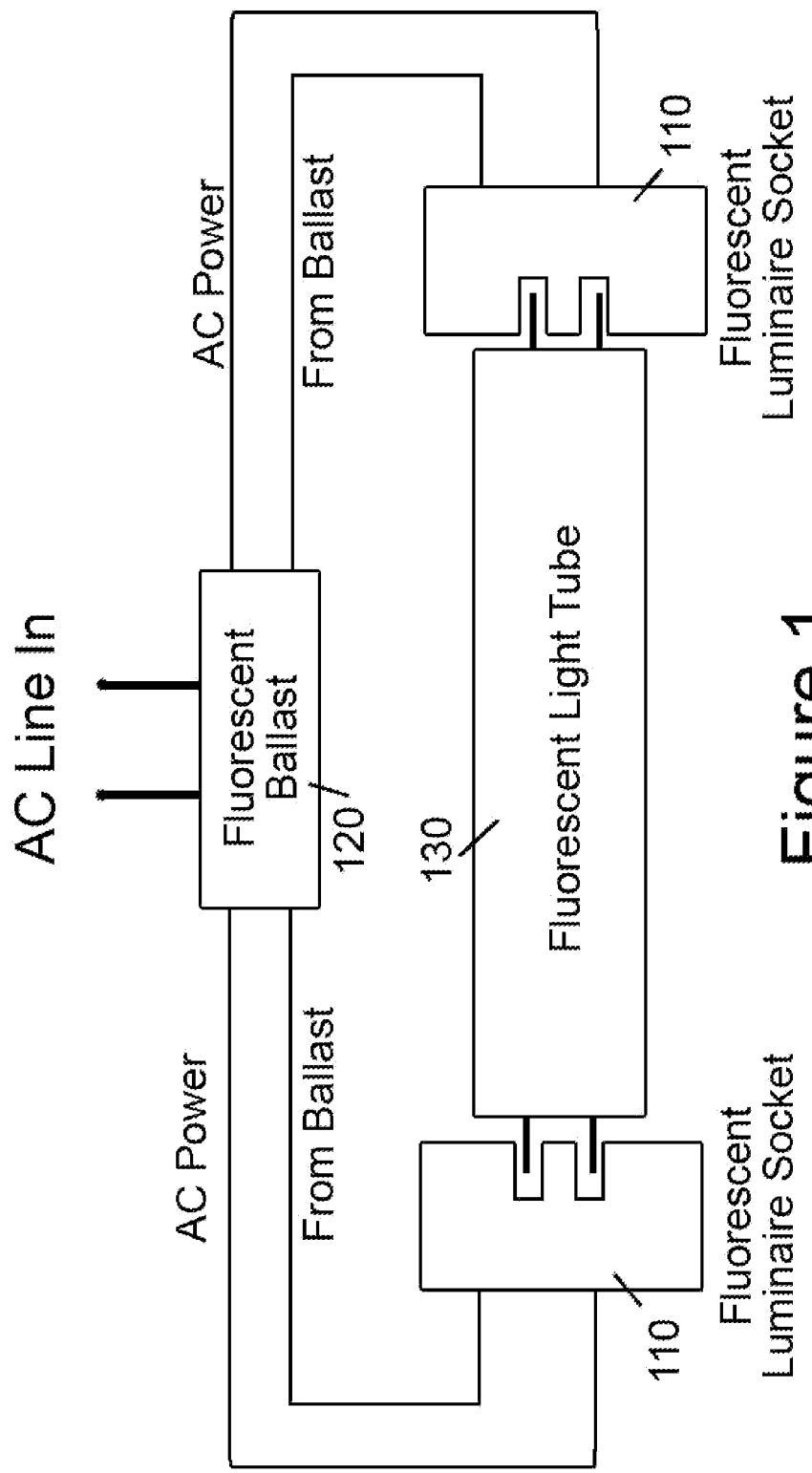
FIG. 1 shows block diagrams illustrating the major functional blocks and their relative position within a Fluorescent Lighting Luminaire or Fixture.

The major functional blocks of a Fluorescent Luminaire or Fixture is exhibited in FIG. 1. These are the Magnetic or Electronic Fluorescent Ballast (MEBal) 120 that receives AC Power from the line voltage which is typically 120 AC in the US. The Magnetic or Electronic Fluorescent Ballast (MEBal) 120 then generates an AC Power from Ballast in a startup sequence and applies that power to the Fluorescent Luminaire Socket (FLSocket) 110. A glass Fluorescent Light Tube (FLT) 130 or bulb is plugged into the FLSocket 110.

A glass Fluorescent Light Tube (FLT) 130 of FIG. 1 in the unlit or off state indicates the gas within the tube is in a non-excited or non-conducting state. A glass fluorescent tube in this unlit or off state acts like a high electrical resistance, low current path to the MEBal 120. A glass fluorescent tube in the lit or on state looks like a low electrical resistance, high current flow path for the MEBal 120. The MEBal 120 on startup senses if FLT 130 gas in the gas in the tube is in the on or off state. The MEBal 120 can apply various different start-up sequences to light or excite the gas in an unlit glass fluorescent tube. The MEBal 120 using a start-up power sequence could preheat the tube with a small current, then apply a very high voltage of possibly over 600 to 1000 volts across the tube, or a combination of current and high voltage sequences to excite the gas in the glass FLT 130 of FIG. 1.

The startup techniques and processes used by the MEBal 120 to turn on a glass Fluorescent Light Tube (FLT) 130 are not required for use with non-fluorescent lighting devices such as an LED Lighting Tubes or Bulbs to replace the glass fluorescent gas tube. In fact the MEBal 120 startup techniques using these high voltages and different current techniques may damage the LED Lighting Tube or Bulb replacements.

Figure 2:
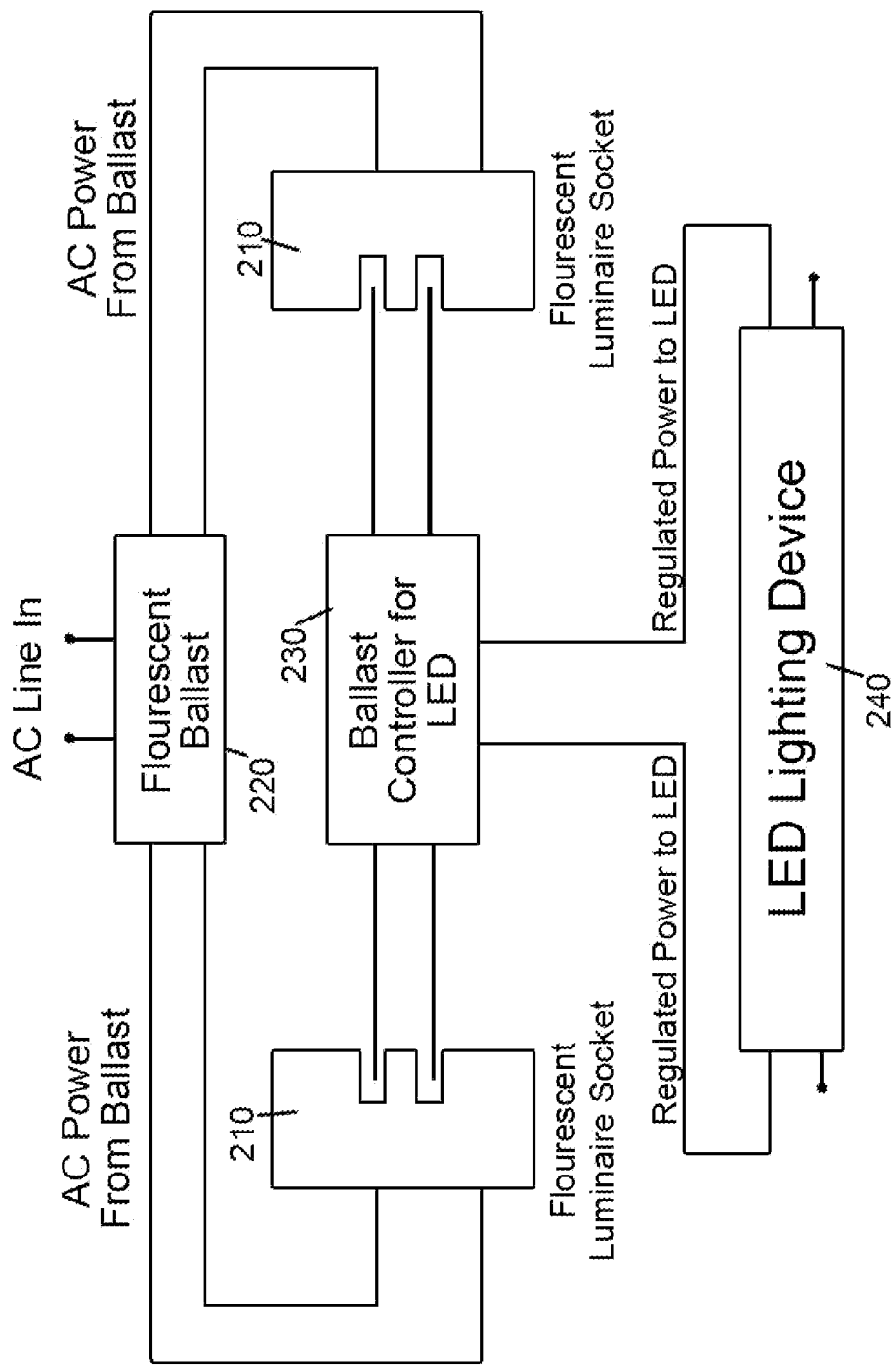
FIG. 2 shows block diagrams illustrating the major functional blocks of a Florescent Lighting Luminaire or Fixture and the new innovated LED Ballast Controller Device (LED BCD) 230 and an LED Lighting Tube or Bulb Device 240.

The LED Ballast Controller Device (LED BCD) 230,330 is a new innovated design and circuitry that will interface with a Fluorescent Lighting Luminaire or Fixture, see FIG. 2, 3. This newly innovated LED BCD 230, 330 circuit device will allow for a non-fluorescent replacement lighting devices like an LED Lighting Tube 210 to be used in a Fluorescent Light Luminaire (fixture) without any electrical wiring modification or removal of the Electronic or Magnetic ballast.

The LED Ballast Controller Device (LED BCD) 230,330 will take input power from a Magnetic or Electronic Fluorescent Ballast (MEBal) 220,320. The new innovated device will evaluate, process, and regulate the power from the MEBal 220, 320 and output a regulated and steady AC power of below 250 volts to operate a non-fluorescent lighting device such as a LED Lighting Tube 240, or LED drivers 350, LED chips, or array of LED chips 360 when embedded in a tube or bulb application.

In one implementation FIG. 2, the configuration for using an non-fluorescent lighting device such as an LED Lighting Tube or device for replacing a fluorescent tube in a fluorescent lighting fixture is provided. The MEBal 220 receives AC Power from the line voltage which is typically 120 AC in the US. The MEBal 220 then generates an AC Power from Ballast in a startup sequence and applies that power to the Fluorescent Luminaire Socket (FLSocket) 210. This startup sequence usually generates high voltages of up to 600 volts to 1000 volts to light up or turn on the gas within a glass fluorescent tube.

The new innovated LED Ballast Controller Device (LED BCD) 230 receives power from the MEBal 220 through the FLSocket 210, senses this high voltage and blocks the it from passing through to a non-fluorescent lighting device such as a LED Tube or Bulb 240. The LED BCD 230 provides the proper feedback signals to handshake with the MEBal 220 and controls the MEBal 220 to complete the start-up high voltage phase and continue on to the normal operating power phase. The LED BCD 230 sense the voltage and when the MEBal 220 power outputs continue to a normal operating phase of below 250 volts, then the LED BCD 230 allows this regulated power to pass safely to the LED Lighting device 240.

In one implementation (see FIG. 3), the configuration for using an LED Lighting Tube or device for replacing a fluorescent tube in a fluorescent lighting fixture is provided. The MEBal 320 receives AC Power from the line voltage which is typically 120 AC in the US. The MEBal 320 then generates an AC Power from Ballast in a startup sequence and applies that power to the FLSocket 310. The new innovated LED BCD 330 device is incorporated into a LED Lighting Tube or Bulb 340. Within LED Lighting Tube or Bulb 340, the LED BCD 330 device receives power through the FLSocket 310 and then outputs a Regulated Power to LED for an LED Driver 350. The LED Driver 350 then supplies power to an LED Chip or an LED Array of Chips 360.

The innovation of this LED BCD 230,330 device is based upon the ability of the novel circuitry to interface with the MEBal 120,220,320 to emulate or respond with characteristics like a glass fluorescent gas tube. The LED BCD 230, 330 uses a novel Dynamic and Adaptive Resistive Load (DRL) 510 of FIG. 5 to dynamically and almost instantaneously change the resistance of the load to the MEBal 120,220,320. The resistance range of the DRL 510 and hence the current drawn from the MEBal 120,220,320 is dynamically controlled by the Timing and Logic Circuit (TLC) 520 of FIG. 5.

The Dynamic Adaptive Resistive Load (FIG. 5, DARL 510) which by use of Resistors (FIG. 610, 620, 630) emulates the voltage and current characteristics of a fluorescent tube during the start-up phase by using resistors instead of active components such as a MOSFET or a Transistor. This allows the current to be dynamically drawn from the FLSocket to be in phase with the voltage and reduces power factor changes.)

Figure 5:
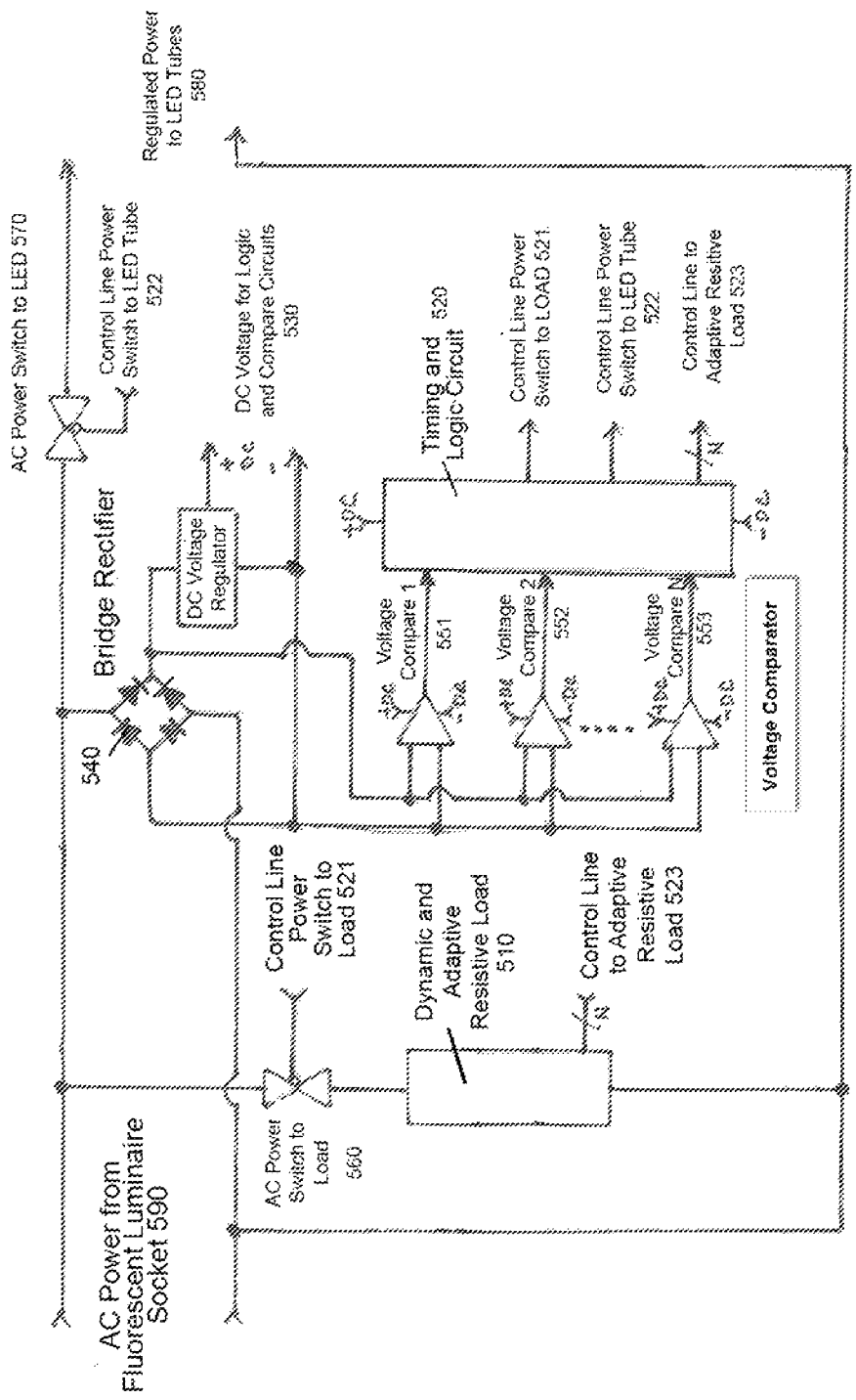
FIG. 5 shows the major functional circuitry blocks and circuit diagram of the new innovation LED Ballast Controller Device (LED BCD) 230, 330.

The detailed circuit diagram of the LED BCD 230, 330 is shown in FIG. 5. The Bridge Rectifier 540 is connected to the AC Power from the MEBal 590 and rectifies the AC signal to a DC signal. A DC Voltage Regulator takes the output of the Bridge Rectifier 540 and generates a steady DC Voltage for the Logic and Compare circuits 530. The Voltage Comparators 551, 552, 553 senses different voltage levels from the Bridge Rectifier 540 and generates signal to the Timing and Logic Circuit (TLC) 520. The TLC generates output signals that then control the Dynamic and Adaptive Resistive Load (DRL) 510, AC Power Switch to Load 560, and AC Power Switch to LED 570.

The Dynamic Resistive Load (DRL) 510 of FIG. 5 has a purely resistive characteristic throughput the entire range of resistances controlled by the Timing and Logic Control (TLC) 520 of FIG. 5. Specifically, the DARL 510 of FIG. 5 is comprised of a plurality of load segments in parallel (see FIG. 6), wherein each leg of the load comprises of an AC Switch and a Resistor.

The resistance range of the DRL can range from 200 ohms to 2000 ohms. This means that the LED BCD 230, 330 through the use of the DRL 510 draws current across the entire range of voltage of the MEBal 120,220,320, that is in phase with the voltage. As a result, the LED BCD 230, 330 does not change the phase of the circuit so that the effective phase of this new innovated device is a Power Factor of 1 or 100%. This means that the LED BCD 230, 330 does not have any material impact on the phase of the power passing through the device circuitry, which allows the device to better control and regulate the MEBal 120,220,320.

This novel DRL circuit allows the LED BCD 230, 330 to interface, control, and regulate the many different type of MEBal 120,220,320 in the market because it accurately emulates the electrical current response characteristics of a glass fluorescent gas tube. There are a very wide range of different MEBal 120,220,320 in the market with many different types of start-up lighting sequences, some are Magnetic type or Electronic type ballasts. The DRL 510 dynamically changes the resistance and can accurately emulate the current draw characteristics like a glass fluorescent tube to control and regulate these many different scenarios.

Figure 6:
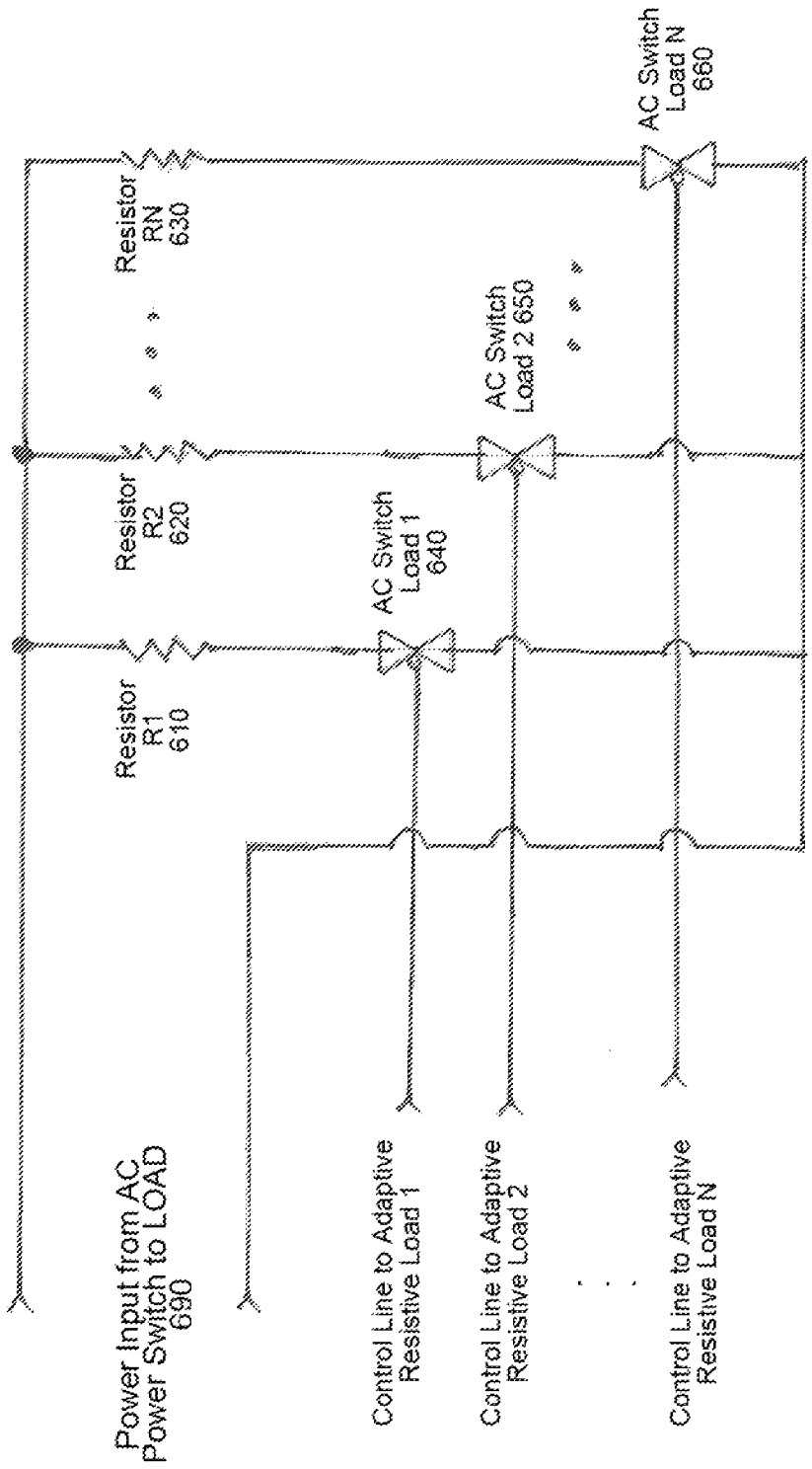
FIG. 6 A detailed circuit diagram of the Dynamic and Adaptive Resistive Load (DRL) 510.

FIG. 6 shows the detailed circuitry of the Dynamic and Adaptive Resistive Load (DRL) 510 from FIG. 5. Control Lines to Adaptive Resistive Load 623 turn on/off current flow to AC Load Switches for Resistors 1 610, Resistor 2 620, and Resistor N 630. The number of AC Switches and Resistors 1 through N are in parallel and allow for greater resolution and dynamic range of the overall DRL 510. The typical number of resistors and AC Switches in the LED BCD 230, 330 is 3 but can be more or less based upon the resolution and dynamic range of the application for US or other World lighting markets. Control Lines 623 increase or decrease current flow for the DRL 510 in response to the MEBal 120,220,320 voltages almost instantaneously to accurately emulate a glass fluorescent gas tube.

The start-up phase of a fluorescent ballast can generate voltages of up to 1000 Volts AC for a period of time in which a circuit attached to the ballast will need to dissipate significant power if it is to emulate a gas tube. This power generates a significant amount of heat which must be safely and quickly dissipated.

By using a plurality of Resistors 610, 620, 630 in parallel solves this problem by allowing said plurality of resistor to be placed in a distributed manner across a tube length to better dissipate any potential heat build-up. The use of AC Switches 640, 650, 660 in series with said Resistor 610, 620, 630 also allows for electrical control of the distributed Resistors on an individual basis for greater circuit reliability. If one leg of the DARL is shorted out or burned out, that leg of the DARL can be electrically shut off. Thus the implementation of physically distributing load current across multiple resistors and electrically control them significantly increases the reliability and thermal efficiency of the device. Prior art that uses a single resistor does not allow current to be changed dynamically since a single resistor is of fixed value and current flowing through the resistor is a fixed ratio between Voltage and Resistance.

The use of Resistors has the benefits of allowing the current drawn from the fluorescent ballast to be more in phase with the voltage, allowing for better emulation of a gas tube. Using a plurality of Resistors as a passive load element in this application has the benefits of the Resistor characteristics of in-phase current and is also different and novel from prior art using active components to achieve dynamic current drawn from the fluorescent ballast. The use of multiple Resistors to draw this current in Applicants claim is a different, novel, specific, and non-obvious way to dynamically draw current with higher reliability passive (distributed) resistors from a fluorescent ballast. Again use of a plurality of resistors as dynamic current draws from the fluorescent ballast is novel with the benefits of heat dissipation across multiple Resistor elements.

Figure 7:
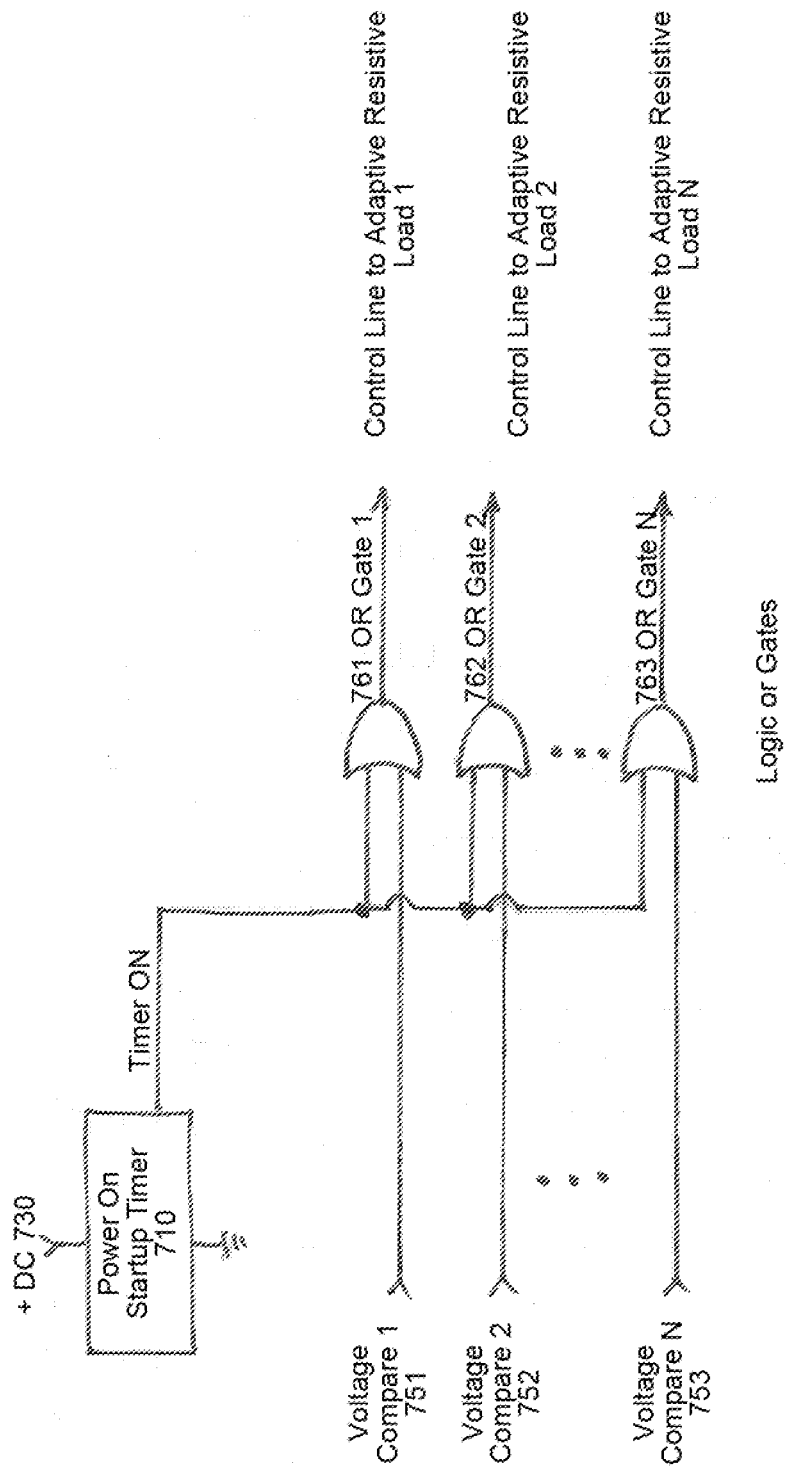
FIG. 7 A detailed circuit diagram of the Timing and Logic Circuit (TLC) 520.

FIG. 7 shows the detailed circuitry of the Timing and Logic Circuit (TLC) 520 from FIG. 5. Power On Start-up timer 710 reads the +DC Power inputs 730 to sense if the power is applied for the first time. If 710 detects power on, the circuit will provide a Timer delay signal to the Logic OR Gates 761,762,763 for proper sequence of the TLC 520. FIG. 7 shows Voltage Comparators inputs 751, 752, 753 representing comparators 1 through N that measure and compare the Voltage Output from the Bridge Rectifier 540 in FIG. 5. Based upon the threshold setting of the Voltage Comparators 551, 552 and 553, these Voltage Comparator inputs 751, 752, 753 are then inputted to Logical OR Gates 761, 762 and 763. The combination of the Power On Startup Timer On signal from 710 and 751,752,753 go onto the Logic OR Gates 761,762, 763. The outputs of the Logic OR Gates generate the Control Line to Adaptive Resistive Load 1 through N 523,623 back to FIGS. 5 and 6 respectively.

Figure 4:
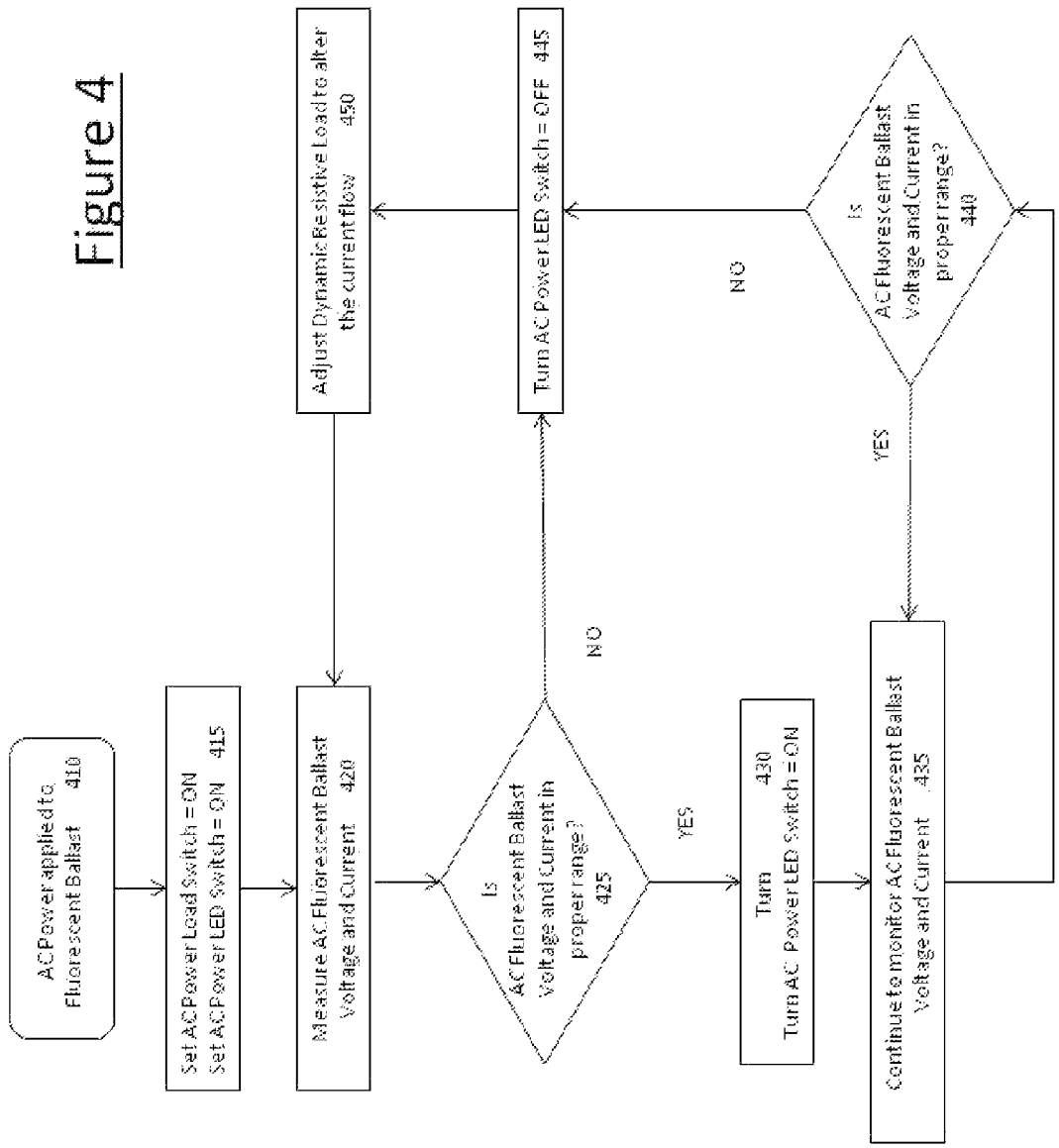
FIG. 4 A flow chart of the major functional operations and decision tree of the new innovated LED Ballast Controller Device (LED BCD) 230,330.

FIG. 4 exhibits the logic and flowchart of the LED BCD 230,330 operation. The flowchart details the operation from the power-on start-up of the circuit 410 through the various operations. The operations include control of AC Power Switches 415, 430 and 445, measurements of voltage 420, 435, decisions based on measurements 425, 440, and adjustments to the Dynamic Resistive Load 510 in operations box 450.

Figure 3:
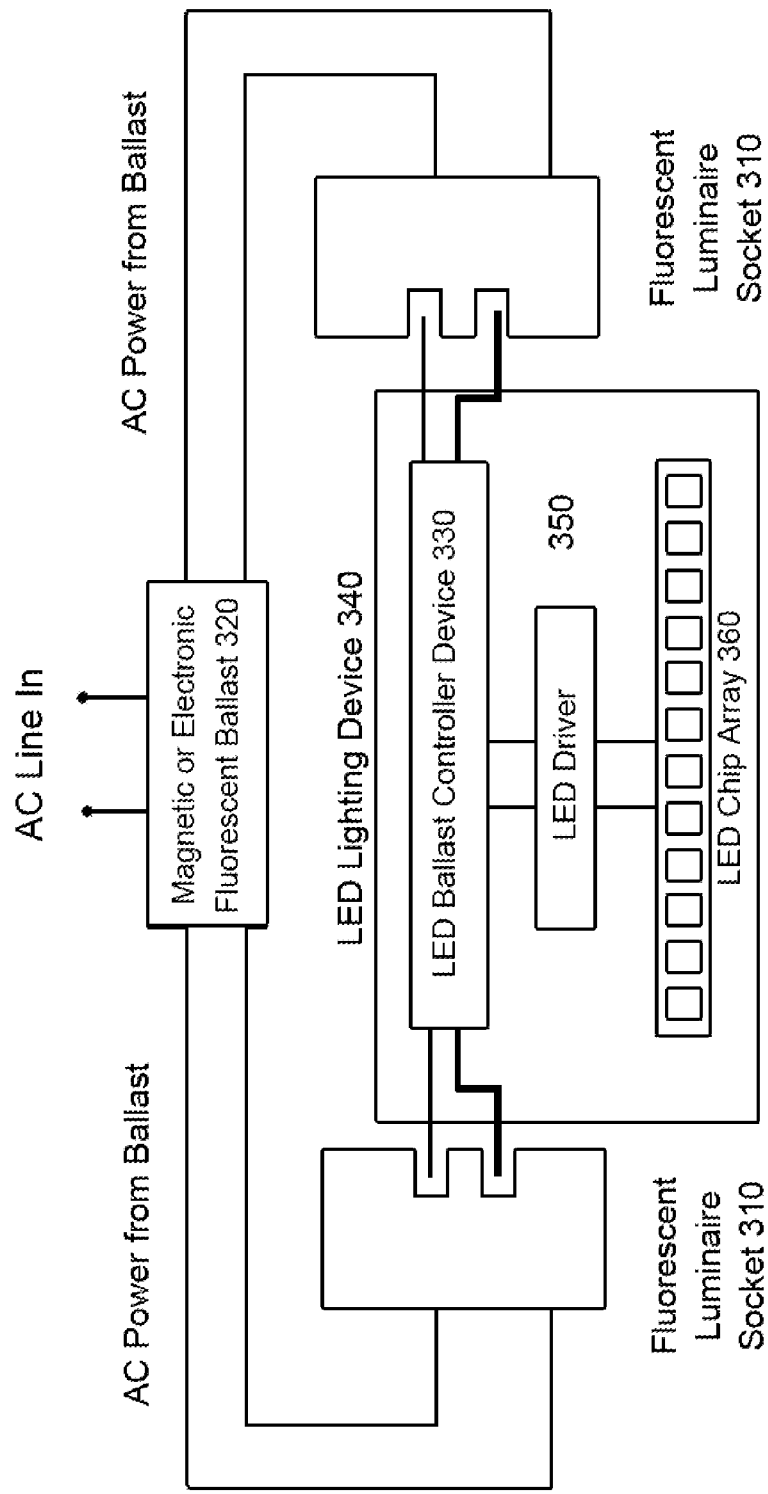
FIG. 3 shows block diagrams illustrating the major functional blocks of a Florescent Lighting Luminaire or Fixture and the new innovated LED Ballast Controller Device (LED BCD) 330 incorporated into an LED Lighting Tube or Bulb Device 340.

In an embodiment, the LED BCD 230, 330 can also be implemented as an embedded device within a non-fluorescent lighting device such as an LED Lighting Tube or Bulb 340. The LED BCD 230, 330 circuitry or circuitry card, would reside inside a LED Lighting Device 340 as shown in FIG. 3. The LED BC 330 would interface internally within the LED Lighting Device 340 to send power to the LED Driver 350. The LED Driver 350 would then supply power to an LED or Array of LED Chips 360.

In another embodiment, referring to FIG. 4, the power on sequence is set to apply power to the Fluorescent Ballast [Step 410], turn on all the AC Power Load Switch and turn on the DARL 510 resistors to the maximum current protection range and turn on the AC Power to LED Switch [Step 415]. This power sequence has the benefits of a faster switch on time to the LED tube but also remain protected as the DARL 510 resistors are set to a high level of voltage protection.

In order to address various issues and advance the art, the entirety of this application for LED Ballast Controller Device (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any electronic components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of electronic conditions such as voltage and current ranges scanned, may execute processes asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a LED Ballast Controller (LED BCD), various embodiments of the LED BCD, may be implemented that enable a great deal of flexibility and customization. For example, aspects of the LED BCD may be adapted for a Circular Fluorescent Tube replacements. While various embodiments and discussions of the LBC have included straight tube fluorescent bulb replacements, however, it is to be understood that the embodiments described herein may be readily configured and/or customized for a wide variety of other applications and/or implementations.

What is claimed:

1. A LED ballast controller device (LED BCD) comprising;
a ballast connector configured to attach into the receptacle of a fluorescent lighting luminaire or gas fluorescent tube lighting fixture "fluorescent lighting socket (FLSocket)" connector,
a first high voltage switch connected between the FLSocket connector and a non-fluorescent lighting device including a LED tube or bulb that is configured to electrically isolate the LED tube or bulb from the FLSocket connector, a second high voltage switch connected between the FLSocket connector and a dynamic adaptive resistive load (DARL), a dynamic adaptive resistive load (DARL) element comprising of a plurality of AC switch-resistor (AC SR) loads in parallel, such that each leg of the parallel load (AC SR) comprises of an AC switch and a resistor in series, a first electronic circuit connected to the FLSocket connector comprising of a bridge rectifier that is configured to convert the input AC voltage to a bridge rectified (DC) voltage, a DC voltage regulator that connects to the bridge rectifier and outputs a stable DC reference voltage, a plurality of voltage comparators which using said stable DC reference voltage compared with bridge rectified (DC) voltage configured to generate voltage signals at various voltage threshold levels, and a second electronic circuit timing logic circuit (TLC) comprising of logic and timing circuitry connected to the voltage comparators, high voltage switches, and the DARL, such that timing logic circuit (TLC) controls the connected elements, wherein the first and second electronic circuits in combination functions to emulate the voltage and current characteristics of a glass fluorescent gas tube during the startup phase of a fluorescent ballast, wherein the first and second electronic circuits in combination functions to allow power from the FLSocket to the non-fluorescent lighting device including a LED tube or bulb during start-up phase with the DARL in a high current protective state protecting the LED tube or bulb from high voltages, wherein the first and second electronic circuits in combination continues to monitor and protect the LED tube or bulb from the high voltages of FLSocket after startup, wherein the functions of the DARL as controlled by the first and second electronic circuits emulate current characteristics in phase with the input voltage from the FLSocket due to the passive resistive characteristics of the attached resistor elements in the DARL, each parallel leg comprising of an AC switch and resistor in the DARL element are turned on or off by the first and second electronic circuits to dynamically simulate a load current characteristic of a fluorescent tube.

2. A device according to claim 1, wherein the device continues monitor and control the output of the FLSocket connector after the initial start-up sequence and block high voltages to the non-fluorescent lighting device including a LED lighting tube or bulb device, and the device blocks harmful high voltage power after start-up from passing to the non-fluorescent lighting device including a LED lighting tube or bulb, even if the LED tube or bulb fails or is electrically disconnected from the FLSocket fixture for a period of time.

3. A method of connecting a fluorescent ballast to a non-fluorescent lighting device including a LED replacement tube or bulb, the method comprising;

receiving an AC voltage input from a fluorescent lamp fixture or ballast;

a first high voltage switch connected between the fluorescent lighting socket (FLSocket) and a non-fluorescent lighting device including a LED tube or bulb that is configured to electrically isolate the LED tube or bulb from the FLSocket connector, a second high voltage switch connected between the FLSocket connector and a dynamic adaptive resistive load (DARL), a dynamic adaptive resistive load (DARL) element comprising of a plurality of AC switch-resistor (AC SR) loads in parallel, such that each leg of the parallel load (AC SR) comprises of an AC switch and a resistor in series, a first electronic circuit connected to the FLSocket connector comprising of a bridge rectifier that is configured to convert the input AC voltage to a bridge rectified (DC) voltage, a DC voltage regulator that connects to the bridge rectifier and outputs a stable DC reference voltage, a plurality of voltage comparators which using said stable DC reference voltage compared with bridge rectified (DC) voltage configured to generate voltage signals at various voltage threshold levels, and a second electronic circuit timing logic circuit (TLC) comprising of logic and timing circuitry connected to the voltage comparators, high voltage switches, and the DARL, such that timing logic circuit (TLC) controls the connected elements, wherein the first and second electronic circuits in combination functions to emulate the voltage and current characteristics of a glass fluorescent gas tube during the startup phase of a fluorescent ballast, wherein the first and second electronic circuits in combination functions to allow power from the FLSocket to the non-fluorescent lighting device including a LED tube or bulb during start-up phase with the DARL in a high current protective state protecting the LED tube or bulb from high voltages, wherein the first and second electronic circuits in combination continues to monitor and protect the LED tube or bulb from the high voltages of FLSocket after startup, wherein the functions of the DARL as controlled by the first and second electronic circuits emulate current characteristics in phase with the input voltage from the FLSocket due to the passive resistive characteristics of the attached resistor elements in the DARL, each parallel leg comprising of an AC switch and resistor in the DARL element are turned on or off by the first and second electronic circuits to dynamically simulate a load current characteristic of a fluorescent tube.

4. A method of claim 3, wherein the device continues monitor and control the output of the FLSocket connector after the initial start-up sequence and block high voltages to the non-fluorescent lighting device including a LED tube or bulb device, and the device blocks harmful high voltage power after start-up from passing to the non-fluorescent lighting device including a LED lighting tube or bulb, even if the LED tube or bulb fails or is electrically disconnected from the FLSocket fixture for a period of time.

\* \* \* \* \*